(No Model.)
T. MORRIS.
PIPE COUPLING FOR FLASKS, &c.
No. 422,242. Patented Feb. 25, 1890.
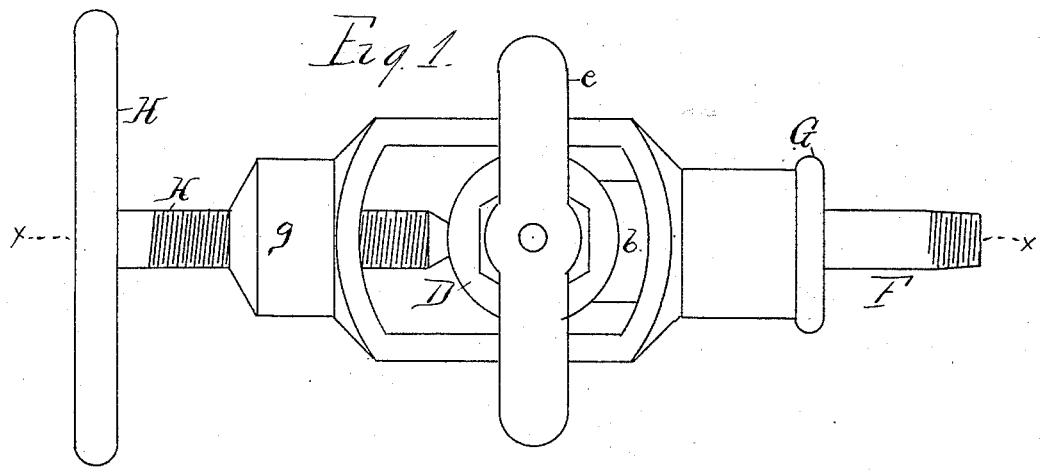
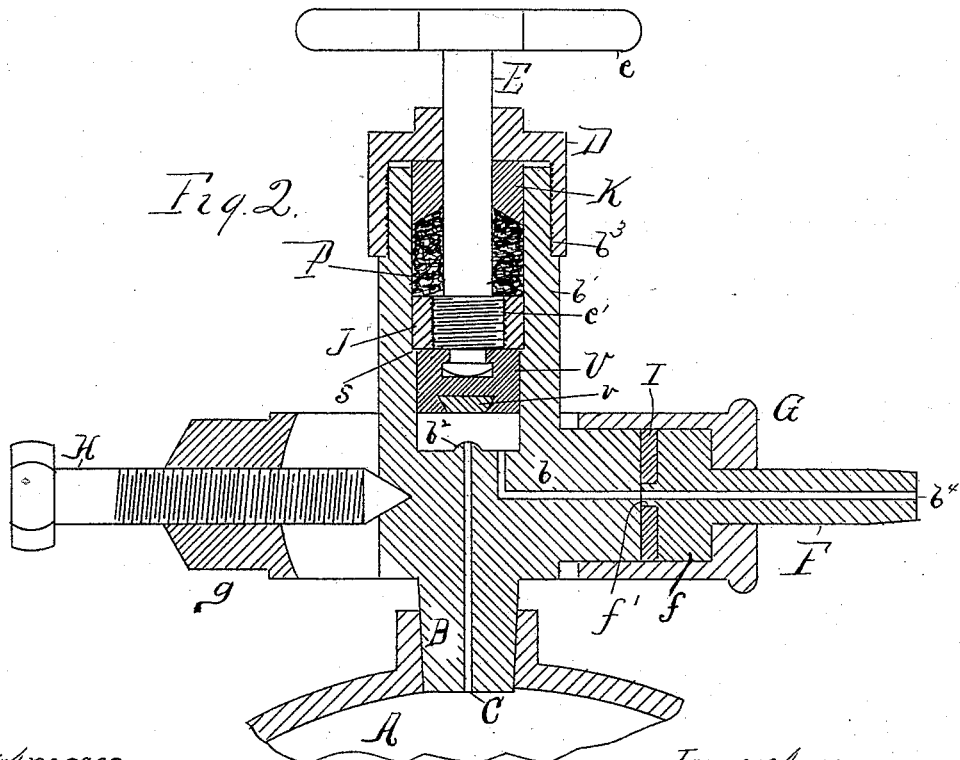
Witnesses.
Harry Bitner
A. L. Flamingham
Inventor.
Theodore Morris,
By his Attys.
Hill & Dixon.

UNITED STATES PATENT OFFICE.

THEODORE MORRIS, OF CHICAGO, ILLINOIS, ASSIGNOR TO THE AUTOMATIC GAS GOVERNOR COMPANY, OF ILLINOIS.

PIPE-COUPLING FOR FLASKS, &c.

SPECIFICATION forming part of Letters Patent No. 422,242, dated February 25, 1890.

Application filed April 22, 1889. Serial No. 308,110. (No model.)

*To all whom it may concern:*

Be it known that I, THEODORE MORRIS, a citizen of the United States of America, residing at Chicago, in the county of Cook and State of Illinois, have invented certain new and useful Improvements in Pipe-Couplings for Flasks and other Vessels, of which the following is a specification.

The drawings present, in Figure 1, a vertical projection of my improved coupling, and in Fig. 2 a vertical cross-section of the same in the plane indicated by the line $x\,x$ of Fig. 1.

My invention relates to the class of pipe couplings or connections that are used to connect a flask or other receptacle designed for the storage of a fluid under high pressure with the pump or other means for charging such flask, and also with the fountain or other vessel into which it is to be discharged. A coupling of this class must answer two requirements: First, it must possess means whereby the port leading from the flask may be tightly closed when desired, and, second, means whereby said port may be put in communication beyond the point of closure with the receptacle from which or to which the fluid is to be passed. The first of these requirements has been met by an infinite variety of cocks, valves, &c.; but the second has been found to present more difficulty.

The object of my invention is to provide improved means for meeting both of said requirements, and especially to enable the coupling and uncoupling to be done as quickly and easily as possible; and to this end it consists in the improved devices and combinations thereof hereinafter set forth, and definitely pointed out in the claim appended hereto.

Referring to the drawings, the flask or vessel in which the fluid is to be stored is represented at A. The opening or mouth of said flask is closed by a screw-plug B, extending outside the flask in the shape of an L, as seen at $b$. Upon the upper portion of this extension is formed a cup $b'$, and in the bottom of this cup a central boss $b^2$ is provided, and a hole C bored through this boss and the plug B, opening into the flask A. A thread $b^3$ is cut upon the upper portion of the cup $b'$, an inverted-cup-shaped nut D threaded thereon, and a stem E centrally fitted into said nut, bearing a handle $e$, and extending down into the cup $b'$ almost to the bottom, where it is connected by a ball-and-socket joint to a valve-block V, loosely guided by the walls of the cup $b'$. Above said block the stem E bears a screw-thread $e'$, moving in a nut J tightly fitted into the cup $b'$ and resting upon a slight shoulder $s$. The stem E is also provided with a collar K. Between the latter and the nut J packing P is placed, the collar K pressed down thereon, and the nut D screwed upon the collar, compressing the packing and effectually closing the central bore of the cup $b'$.

In operation the valve-block V is raised and lowered by means of the stem E and thread $e'$ thereon, and the under surface of the block, which is screwed down upon the boss $b^2$ inclosing the port C, is faced with a slightly elastic or yielding substance $v$, preferably hard rubber, to insure a perfect fit and a complete closure of said port. The latter result is further insured by the ball-and-socket connection with the stem E, which allows the block V to adjust itself upon the boss $b^2$.

To attach the flask to the receptacle from which or to which the fluid is to pass, a pipe F is provided at one end with an external screw-thread adapted to screw into an opening in the walls of said receptacle or some connection thereof, and at the other end with an enlarged portion G, sufficiently large to be bored to receive loosely the extension $b$ of the plug B. This enlarged portion G is carried around the plug B in the shape of a yoke $g$, and provided on the opposite side with a clamping-screw H, threaded into said yoke and moving in line with the axis of the pipe F. This yoke is so proportioned to the other parts that it can be readily slipped over the extension $b$ of the plug B, and the screw H be brought to bear upon the opposite side of said plug, where it is accurately centered by tapering it off at the end and boring a shallow hole in the side of the plug to receive it.

To make the tight coupling between the extension $b$ and the pipe F, a washer I, of some slightly-elastic material, is placed in the enlarged end of the pipe F, the portion $b$ of the plug B inserted thereafter and clamped tightly against said washer by means of the screw H. As the great pressure necessary to make a tight joint tends to crush the washer I into the central opening, I extend the head $f$ into a central boss $f'$ about the port $b^4$ and make the hole in the washer large enough to receive this boss. Such construction gives the washer inside support, while the walls of the part G furnish support around the outside, and hence it is impossible for it to yield in either direction. It is immaterial whether this boss $f'$ be on the part $f$ or on the part $b$, and the latter can be substituted, if desired, for any reason.

It will be noticed that in the drawings the pipe F and enlarged end G thereof are made in separate pieces, the part G being bored a portion of the way through to receive the part $b$ of the plug, and a smaller hole being made through the remainder to hold the pipe F. The last is provided with an enlarged head $f$, fitting loosely in the larger portion of the part G and furnishing an abutment for the washer I. This minor improvement leaves the yoke loose upon the pipe F, except when the parts are clamped together, and renders the making of the connection much easier.

I claim as new and desire to secure by Letters Patent—

The combination of plug B, pipe F, yoke G $g$, screw H, with the washer I, supported centrally by the boss $f'$, and around its periphery by the walls of the part G, as and for the purpose stated.

THEODORE MORRIS.

Witnesses:
  L. HILL,
  H. BITNER.